United States Patent
Wang (10) Patent No.: US 12,387,113 B1
(45) Date of Patent: Aug. 12, 2025

(54) SYSTEMS AND METHODS FOR PROCESSING ELECTRONIC REQUESTS

(71) Applicant: MASSACHUSETTS MUTUAL LIFE INSURANCE COMPANY, Springfield, MA (US)

(72) Inventor: Peng Wang, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 1137 days.

(21) Appl. No.: 17/004,587

(22) Filed: Aug. 27, 2020

Related U.S. Application Data (60) Provisional application No. 62/892,315, filed on Aug. 27, 2019.

(51) Int. Cl.
*G06N 5/022* (2023.01)
*G06F 8/30* (2018.01)
*G06F 8/51* (2018.01)
*G06F 9/54* (2006.01)
*G06F 16/955* (2019.01)
*G06N 5/04* (2023.01)

(52) U.S. Cl.
CPC ............... *G06N 5/022* (2013.01); *G06F 8/30* (2013.01); *G06F 8/51* (2013.01); *G06F 9/541* (2013.01); *G06F 9/547* (2013.01); *G06F 16/955* (2019.01); *G06N 5/04* (2013.01)

(58) Field of Classification Search
None
See application file for complete search history.

(56) References Cited

U.S. PATENT DOCUMENTS

| | | | | |
|---|---|---|---|---|
| 8,762,311 B1 * | 6/2014 | Englehart | ................. | G06F 8/41 706/45 |
| 2009/0260004 A1 * | 10/2009 | Datta | ....................... | G06F 8/65 717/175 |
| 2019/0080257 A1 * | 3/2019 | Chen | ....................... | G06N 5/04 |
| 2019/0318122 A1 * | 10/2019 | Hockey | ............... | G06F 21/6245 |

OTHER PUBLICATIONS

Imputation (statistics), Wikipedia (Year: 2016).*
"What are Network Packets and how do they work," (Year: 2018).*
"What are virtual machines," IBM (Year: 2019).*
"How Data URIs Speed Improve Website Speed," West, Treehouse, p. 1 (Year: 2014).*
"What is two-factor authentication," Authy (Year: 2018).*

* cited by examiner

*Primary Examiner* — Schyler S Sanks
*Assistant Examiner* — Paul J Breene
(74) *Attorney, Agent, or Firm* — Foley & Lardner LLP (57) ABSTRACT

Disclosed herein are embodiments of systems, methods, and products comprises a server for efficiently processing electronic requests. The server receives a plurality of predictive computer models and generates a specification file for each model by parsing the source code of each model. When the server receives an electronic request, the API layer of the server validates the request by verifying the inputs of the request satisfying validation codes in the specification file of the corresponding model. If the electronic request is invalid, the server imputes valid values for the request and sends the imputed values to the model execution layer. Within the model execution layer, the server utilizes an integrated development environment of a third-party server to call the function of the corresponding model. The model execution layer transmits the function's output results back to the API layer, which transmits the output results to the user device.

20 Claims, 3 Drawing Sheets

SYSTEMS AND METHODS FOR PROCESSING ELECTRONIC REQUESTS

CROSS REFERENCE TO RELATED APPLICATIONS

This application claims priority to U.S. Provisional Application No. 62/892,315, filed Aug. 27, 2019, which is incorporated herein by reference in its entirety for all purposes.

TECHNICAL FIELD

This application relates generally to methods, systems, and a system architecture for processing electronic requests.

BACKGROUND

As the processing power of computers allows for greater computer functionality and the Internet technology era allows for interconnectivity between computing systems, many existing software solutions receive a high volume of electronic requests. To satisfy the electronic requests, the sever receiving the requests may need to execute different predictive computer models for different requests. Managing such electronic requests in a reliable and efficient manner is difficult.

In existing and conventional software solutions, after the server receives the electronic requests, an API (application programming interface) layer of the server may identify the requested predictive computer models, and load the models from memory. If the models are not in local memory, the API layer of the server may load them into memory from a cross-platform database. The API layer may also convert the inputs into a data frame and pass the inputs to the models for execution. As a result, the conventional software solutions perform the receiving and processing of the requests, and loading and execution of the models in the same environment.

Existing software solutions, utilizing conventional methods, have encountered a new set of technical challenges. First, existing and conventional software solutions may have consistent failures because of invalid inputs. The conventional software solutions may put the responsibility of knowing how to send right requests on the users. If the users send an invalid request, the system may crash. Specifically, invalid input may lead to segment faults and system crash. A segmentation fault or access violation is a fault, or failure condition, raised by hardware with memory protection, notifying an operating system the software has attempted to access a restricted area of memory. The segment faults may lead to memory dump, which is a process of recording the state of the working memory of a computer program at the time of crash. The memory dumps may lead to the next request failing.

Second, existing and conventional software solutions may have intermittent failures due to overloaded resource pool. All the models share the same environment and the same pool of resources, which may lead to system crashes and slow downs. In conventional software solutions, only one predictive computer model runs at a time, which may monopolize the CPU (central processing unit) of the server. Furthermore, because the API layer may load the models from a cross-platform database if the models are not in memory, it may take a long duration for satisfying the requests. The timeouts from long-duration requests may cause low efficiency, especially when low-priority batch predictions may monopolize the resources.

SUMMARY

For the aforementioned reasons, what is needed is a system and method to execute different predictive computer models not only at scale, but also with a short response time. What is further needed is a system and method to validate requests before executing the models. What is also needed is a new system architecture that separates the API layer and the model execution layer.

Embodiments disclosed herein address the above challenges by providing a system and method for efficiently processing electronic requests. Specifically, an analytic server may have a plurality of predictive computer models registered on a model-by-model basis. The analytic server may receive a model specification file for each model that defines the expected inputs and other description of the model. Based on the model specification file, the analytic server may extract a set of validation codes for each model. When the analytic server receives an electronic request to execute one of the predictive computer models, the API layer of the analytic server may validate the electronic request by verifying the inputs of the request satisfying the set validation codes of the corresponding model. If the electronic request is invalid, the analytic server may return an error message immediately with helpful information to the user. Alternatively, the analytic server may impute one or more valid values for the inputs of the electronic request. If the electronic request is valid, the API layer of analytic server may send the electronic request to predictive model execution layer. If the electronic request is not valid, the API layer of the analytic server may send the electronic request with imputed values to the predictive model execution layer. Within the predictive model execution layer, the analytic server may execute the corresponding model based on the request inputs or imputed values and generate output results. The predictive model execution layer may transmit the output results back to the API layer, which may transmit the output results to the user device.

The API layer may perform the input validation to make sure that only valid requests are processed. The invalid requests are filtered out and will not cause system crash. The analytic server may separate the predictive model execution layer from the API layer. Execution of the predictive computer models may be through an integrated development environment in computer programming. Such an integrated development environment may provide built-in scalability to enable efficient resource allocation and load balance. For example, the integrated development environment may provide a publishing platform for teamwork created by different team members. Team members may be able to share different applications, reports, dashboards, notebooks, models, and any other static or dynamic content in one convenient place. Execution servers of the integrated development environment may run across a multi-node cluster, providing an option to scale computation horizontally and ensure high availability for all the content.

In one embodiment, a method comprises automatically generating, by a server, a model specification file for each predictive computer model of a plurality of predictive computer models by parsing source code of each predictive computer model, the source code indicating a set of validation codes comprising at least one required input range and type to execute the predictive computer model; registering, by the server, each predictive computer model by creating a package to include functions of the respective predictive computer model; receiving, via an application programming interface layer of the server, from an electronic device, an electronic request to execute a first predictive computer model of the plurality of predictive computer models using a set of inputs; validating, by the server in the application programming interface layer, the electronic request by verifying that the set of inputs corresponds to the required input range and type in the set of validation codes of the first predictive computer model; and in response to the set of inputs not corresponding to the required input range and type in the set of validation codes of the first predictive computer model: imputing, by the server, one or more valid values for the set of inputs within the required range and type; executing, by a model execution layer of the server, the first predictive computer model based on the imputed one or more valid values by calling functions of the first predictive computer model within its respective package to generate output results; and transmitting, by the model execution layer of the server, the generated output results to the application programming interface layer of the server, whereby the application programming interface layer of the server transmits the generated output results to the electronic device.

In another embodiment, a server comprises a processor and a non-transitory computer-readable medium containing instructions that when executed by the processor causes the processor to perform operations comprises automatically generate a model specification file for each predictive computer model of a plurality of predictive computer models by parsing source code of each predictive computer model, the source code indicating a set of validation codes comprising at least one required input range and type to execute the predictive computer model; register each predictive computer model by creating a package to include functions of the respective predictive computer model; receive, via an application programming interface layer of the server, from an electronic device, an electronic request to execute a first predictive computer model of the plurality of predictive computer models using a set of inputs; validate, by the server in the application programming interface layer, the electronic request by verifying that the set of inputs corresponds to the required input range and type in the set of validation codes of the first predictive computer model; and in response to the set of inputs not corresponding to the required input range and type in the set of validation codes of the first predictive computer model: impute one or more valid values for the set of inputs within the required range and type; execute the first predictive computer model based on the imputed one or more valid values by calling functions of the first predictive computer model within its respective package to generate output results; and transmit the generated output results to the application programming interface layer of the server, whereby the application programming interface layer of the server transmits the generated output results to the electronic device.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein provide a system and method for efficiently processing electronic requests by executing different predictive computer models. An analytic server may register the predictive computer models on a model-by-model basis. Specifically, data scientists may develop a plurality of predictive computer models for different services. The data scientists may use a template to generate a model specification file for each model. The model specification file may define the expected inputs, the expected outputs, and the model's purpose. The data scientists may register these predictive computer models at the analytic server. The analytic server may utilize an integrated development environment provided by a third-party server to execute the predictive computer models. The analytic server may create a package in the integrated development environment to include the functions of the predictive computer models. The third-party server may perform the execution of the predictive computer models. The third-party server may have built-in scalability that can ensure that a large number of electronic requests are processed at the same time.

The analytic server may validate the electronic requests based on a set of validation codes corresponding to the expected inputs included in the model specification files. If a user sends a wrong request, the API layer of the analytic server may determine that the wrong request does not pass the validation. The analytic server may impute one or more valid values for the inputs of the electronic requests and execute the corresponding predictive computer model based on the imputed values. By filtering out invalid electronic requests that may cause system crash and imputing valid values for the invalid electronic requests, the analytic server may provide more robust services and improve user experiences.

The analytic server may execute the predictive computer models in a different layer than the API layer. Specifically, the analytic server may have two layers: the API layer and the predictive model execution layer. The API layer may receive and process the electronic requests from users, and perform the input validation. If the electronic request pass the validation, the API layer may send the electronic requests to the predictive model execution layer. In the predictive model execution layer, the analytic server may execute the different models by leveraging the integrated development environment provided by the third-party server. The communication between these two layers may be through a remote procedure call (RPC) protocol. The API has an RPC client that manages communication with each registered predictive computer models.

Figure 1:
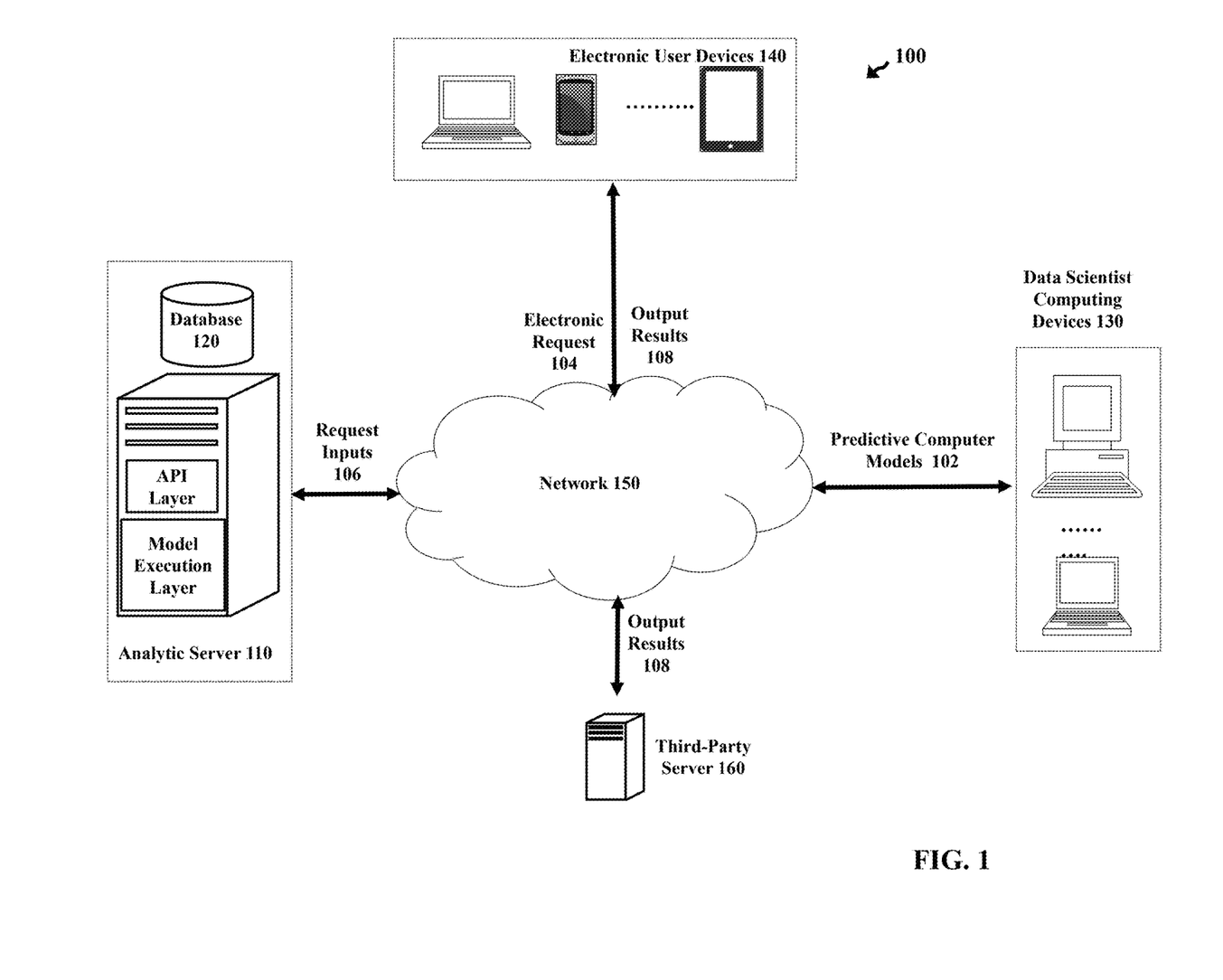
FIG. 1 illustrates a computer system for processing electronic requests, according to an embodiment.

FIG. 1 illustrates components of a system 100 for processing electronic requests, according to an embodiment. The system 100 may comprise an analytic server 110, a database 120, a set of electronic user devices 140, data scientist computing devices 130, and a third-party server 160 that are connected with each other via hardware and software components of one or more networks 150. Examples of the network 150 include, but are not limited to, Local Area Network (LAN), Wireless Local Area Network (WLAN), Metropolitan Area Network (MAN), Wide Area Network (WAN), and the Internet. The communication over the network 150 may be performed in accordance with various communication protocols, such as Transmission Control Protocol and Internet Protocol (TCP/IP), User Datagram Protocol (UDP), and IEEE communication protocols.

The analytic server 110 may be any computing device comprising a processor and other computing hardware and software components, configured to receive and process electronic requests. The analytic server 110 may be logically and physically organized within the same or different devices or structures, and may be distributed across any number of physical structures and locations (e.g., cabinets, rooms, buildings, cities).

The analytic server 110 may be a computing device comprising a processing unit. The processing unit may include a processor with computer-readable medium, such as a random access memory coupled to the processor. The analytic server 110 may be running algorithms or computer executable program instructions, which may be executed by a single processor or multiple processors in a distributed configuration. The analytic server 110 may be configured to interact with one or more software modules of a same or a different type operating within the system 100.

Non-limiting examples of the processor may include a microprocessor, an application specific integrated circuit, and a field programmable object array, among others. Non-limiting examples of the analytic server 110 may include a server computer, a workstation computer, a tablet device, and a mobile device (e.g., smartphone). Some embodiments may include multiple computing devices functioning as the analytic server 110. Some other embodiments may include a single computing device capable of performing the various tasks described herein.

The analytic server 110 may be connected to the electronic user devices 140 and the data scientist computing devices 130 via the network 150. The analytic server 110 may receive a plurality of electronic requests from a plurality of electronic user devices 140. Users operating the electronic user devices 140 may generate the electronic requests for different prediction services. The analytic server 110 may receive a plurality of predictive computer models from the data scientist computing devices 130. The analytic server may execute the predictive computer models to satisfy the electronic requests.

The set of electronic user devices 140 may be any computing device allowing a user to interact with the analytic server 110. The electronic user devices 140 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The electronic user devices 140 may comprise any number of input and output devices supporting various types of data, such as text, image, audio, video, and the like.

A user operating the electronic user device 140 may issue an electronic request for a certain prediction service. For example, a customer or a sales agent may issue a request to determine the customer's mortality score. The electronic request may comprise a set of inputs, such as user age, heart condition, smoking status, and the like. The users may initiate the electronic requests by interacting with a graphical user interface (GUI) provided by the analytic server 110. For example, the users may enter a set of inputs in the GUI and request to execute a predictive computer model based on the set of inputs. The users may initiate the electronic requests through web applications (e.g., comprising a hyperlink of a website) and/or mobile applications installed in the electronic user devices 140. Different users may issue electronic requests for different prediction services. The analytic server 110 may have a plurality of predictive computer models with each predictive computer model providing a different prediction service. The plurality of predictive computer models may be individual models developed by different data scientists.

The data scientist computing device 130 may be any computing device allowing a data scientist to interact with the analytic server 110. The data scientist computing device 130 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The data scientist computing device 130 may comprise any number of input and output devices supporting various types of data, such as text, image, audio, video, and the like.

Each data scientist may train a predictive computer model for a certain prediction service on the data scientist computing device 130. The data scientist may also create a model specification file to describe the model based on a template provided by the analytic server 110. The model speciation file may include description on the service provided by the model, the expected inputs, the expected outputs, and the like. The data scientist may fill in configuration data for a set of fields in the template to describe the trained model, such as the data types and ranges of the inputs, the expected output, the provided service of the model, and the like. Alternatively, the analytic server 110 may automatically generate the model specification file for each predictive computer model by parsing the source code of the predictive computer model.

The analytic server 110 may receive the plurality of predictive computer models and their specification files from the data scientist computing devices 130. The analytic server 110 may register these predictive computer models on a model-by-model basis. The analytic server 110 may create a record for each model and save the models and their model specification files in a database 120. The analytic server 110 may register each predictive computer model by adding the source code of each model in a package of an integrated development environment. The analytic server 110 may further add comments to the function of each predictive computer model comprising the identifier (ID) of the predictive computer model. The analytic server 110 may also define/assign the path/location of the package in the form of URL (uniform resource locator). Users/systems may visit the URL to access the package and call the predictive computer models based on their IDs.

The database 120 may be any non-transitory machine-readable media configured to store the predictive computer models and their specification files. For example, data in database 120 may comprise the description on the service provided by the model, the input schemas/rules, the expected output, flow pattern description of the model, and any other information about the model. The input schemas/rules may define the data types of the inputs, the ranges of numbers, string lengths of the inputs, and the like. The database 120 may further comprise the electronic requests and the responses to the requests. The database 120 may include any other related data of the predictive computer models. The database 120 may be part of the analytic server 110. The database 120 may be a separate component in communication with the analytic server 110. The database 120 may have a logical construct of data files, which may be stored in non-transitory machine-readable storage media, such as a hard disk or memory, controlled by software modules of a database program (e.g., SQL), and a database management system that executes the code modules (e.g., SQL scripts) for various data queries and management functions.

The analytic server 110 may extract a set of validation codes for each predictive computer model based on the model specification file. The analytic server may comprise two layers: the API layer and the predictive model execution layer. Although the two layers are housed in the analytic server 110 in the figure, the two layers could be installed/housed in any other computing devices featured in FIG. 1. When the analytic server 110 receives an electronic request from the electronic user device 140, the API layer of the analytic server 110 may validate the electronic request by verifying the inputs of the request satisfying the set validation codes of the corresponding model.

If the electronic request is valid, the API layer of analytic server 110 may send the electronic request to predictive model execution layer. Within the predictive model execution layer, the analytic server 110 may call the corresponding model, execute the model based on the request inputs, and generate output results. The analytic server 110 may execute the corresponding model in the model execution layer that is separate from the API layer. The predictive model execution layer may transmit the output results back to the API layer, which may transmit the output results to the electronic user device 140. If the electronic request is invalid, the analytic server 110 may impute one or more valid values for the inputs of the electronic request. The analytic server 110 may execute the corresponding predictive computer model based on the imputed values of the inputs.

In the execution of the predictive computer models, the analytic server 110 may utilize an integrated development environment provided by a third-party server 160 (e.g., integrated development environment server) to call the functions of the predictive computer models. The analytic server 110 may create a package in the integrated development environment to include the functions of the predictive computer models. Furthermore, the analytic server 110 may define the web APIs by adding special comments to the functions of the predictive computer models. The comment for each function may comprise an ID for the function. The analytic server 110 may further define the location of the package in the form of URL. The analytic server 110 may visit the URL of the packet appended with the function ID to run the specific function of the predictive computer model.

The execution of the predictive computer models may be through the integrated development environment provided by a third-party server 160, such as the integrated development environment server. The third-party server 160 of the integrated development environment, such as the integrated development environment execution server may perform the execution of the functions of the predictive computer models. As a result, the analytic server 110 may shift the computation or the execution of the predictive computer models to the third-party server 160, which may have built-in scalability for resource allocation and load balance.

The third-party server 160 may be a computing device comprising a processor and other computing hardware and software components for certain services. The third-party server 160 may be a remote server that can be accessed over the network 150. For example, the third-party server 160 may be integrated development environment server. Users/systems may be able to access the integrated development environment from anywhere via a web browser. The third-party server 160 may allow users to share projects and edit code files simultaneously with others. For example, the integrated development environment may provide a platform to share various resources including static and dynamic content in one place. The third-party server 160 may run multiple analyses in parallel and provide load balance across two or more servers. The third-party server 160 may run across a multi-node cluster to scale computation and ensure high availability of all the content.

In operation, the data scientist computing device 130 may transmit a plurality of predictive computer models 102 to the analytic server 110 over the network 150. The analytic server may receive the predictive computer models 102 and generate the model specification file for each model. The analytic server 110 may store the predictive computer models and their specification files in the database 120. The analytic server 110 may receive an electronic request 104 from the electronic user device 140 via the API layer. The API layer may validate the received electronic request 104 by verifying the request inputs satisfying the validation codes in the model specification file. If the electronic request is not valid, the analytic server 110 may impute one or more valid values for the request inputs. The model execution layer may call the function of the predictive computer model corresponding to the electronic request based on the request inputs 106. The model execution layer of the analytic server 110 may transmit request inputs 106 (e.g., the imputed request inputs for invalid request or the original request inputs for valid request) to the third-party server 160. The third-party server 160 may execute the predictive computer model, and output results 108. The third-party server 160 may transmit the output results 108 to the model execution layer of the analytic server 110. The model execution layer may transmit the output results to the API layer, which further transmits the output results 108 to the electronic user device 140.

Figure 2:
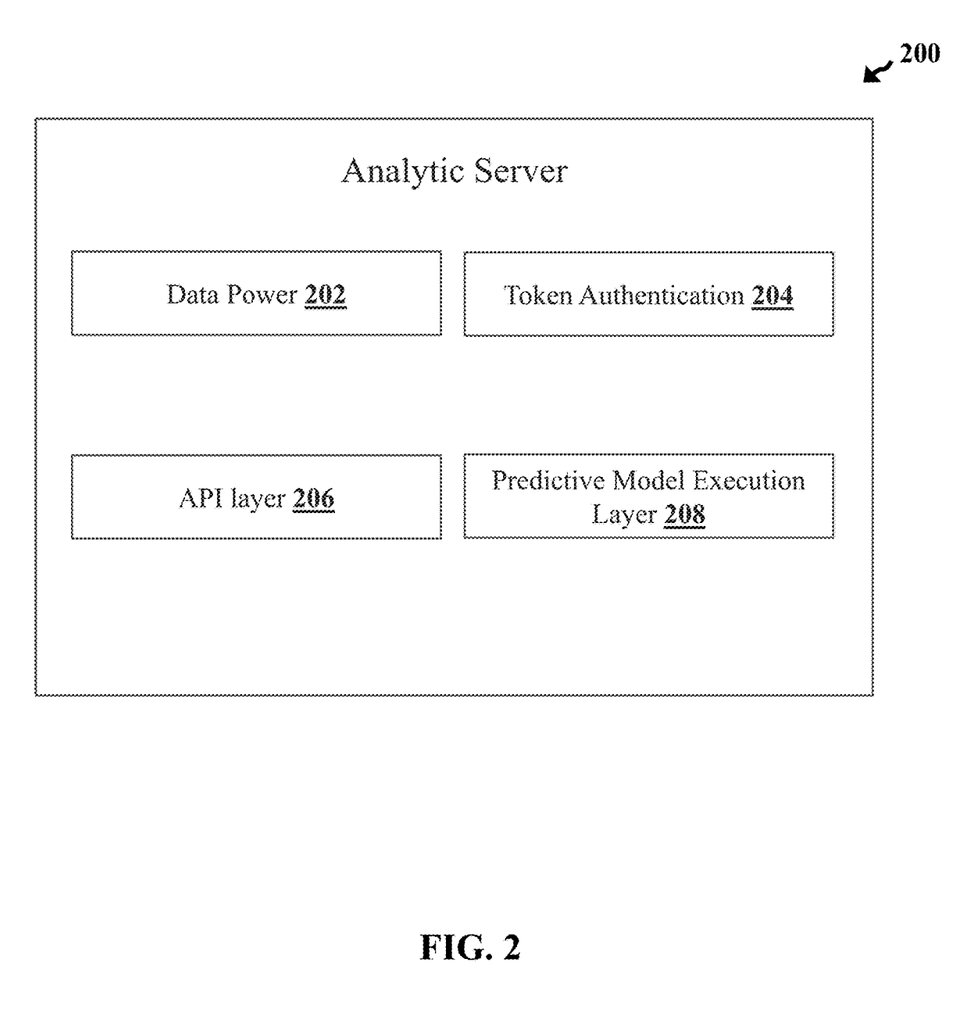
FIG. 2 illustrates components of an analytic server for processing electronic requests, according to an embodiment.

FIG. 2 illustrates components 200 of the analytic server for processing electronic requests, according to an embodiment. The analytic server processing the electronic requests may comprise the following components: data power 202, token authentication 204, API layer 206, and predictive model execution layer 208.

The data power 202 may be an HTIP (hypertext transfer protocol) gateway that provides security, control, integration, and optimized access for the services connected to it. The analytic server may route all traffic to the API layer 206 through data power 202. The data power 202 may provide two key pieces of functionality: logging and monitoring/alerting. For logging, the data power 202 may provide rich logging of all incoming and outgoing prediction requests. For monitoring/alerting, the data power 202 may have the capability to alert an administrative user immediately of any service interruptions and/or abnormally high latency for prediction requests. This functionality may ensure that the administrative user knows any potential issues and patches them before the issues influence the customers.

The token authentication 204 may provide authentication/authorization for two types of interactions: new predictive computer model upload/registration and prediction requests. In new predictive computer model upload/registration, data scientists looking to upload a new model to process prediction requests may need to log in with their credentials and verify their IDs with two-factor authentication. To issue prediction requests, the users may need a valid OKTA (an identity standard) access token. Access tokens may be granted to the users via client credential authentication flow (e.g., by requiring the users to log in with their credentials or by requiring client ID and its associated secret key).

The API layer 206 may leverage a lightweight toolkit for building efficient asynchronous web services (e.g., STAR-LETTE). The API layer 206 may provide the following functionalities: prediction execution service registration, input validation, clean separation, error handling, and SWAGGER specification.

In the prediction execution service registration, data scientists developing the predictive computer models may register their model services by using a model specification file, such as a human-readable data-serialization file (e.g., YAML). The model specification file may define the expected input necessary to make a successful prediction request, the expected output schema of a particular model, the model's purpose and/or service in plain-language. The data scientists may need to verify their IDs with two-factor authentication before they register their models.

In the input validation, the API layer 206 may validate a request before satisfying the request. For example, when the API layer 206 receives a prediction request that requires one of the registered models to execute, the API layer 206 may validate the request inputs against the input schemas specified in the model specification file (e.g., the YAMIL, file used to register the model/service). For invalid request, the API layer 206 may return a 400 BAD REQUEST response with helpful, human-readable error messages in the response. Alternatively, the analytic server may impute one or more valid values for the inputs of the electronic request.

For the clean separation, the model execution may happen separately from the API layer 206. The model execution are in the predictive model execution layer 208. All communication between the API layer 206 and the predictive model execution layer 208 may be through efficient RPC protocol.

In error handling, the API layer 206 may catch and log any unexpected errors that arise during a prediction. In addition to the input validation, the model specification YAML file may also be used to create a full-featured SWAGGER specification that describes request/response models in addition to all available HTTP (hypertext transfer protocol) interactions supported by the system.

In the predictive model execution layer 208, the analytic server may call a predictive computer model through a third-party platform. Execution of the predictive computer models may be through an integrated development environment in computer programming. Such an integrated development environment may provide built-in scalability to enable efficient resource allocation and load balance.

The analytic server may create a package in the integrated development environment to include the functions of the predictive computer models. Furthermore, the analytic server may define the web APIs by adding special comments to the functions of the predictive computer models. The comment for each function may comprise an ID for the function. The analytic server may further define the location of the package in the form of URL. The analytic server may call the function of the corresponding predictive computer model by accessing the package containing the model and running the function based on the function ID. In operation, the analytic server may visit the URL of the packet appended with the function ID to run the specific function of the predictive computer model.

Figure 3:
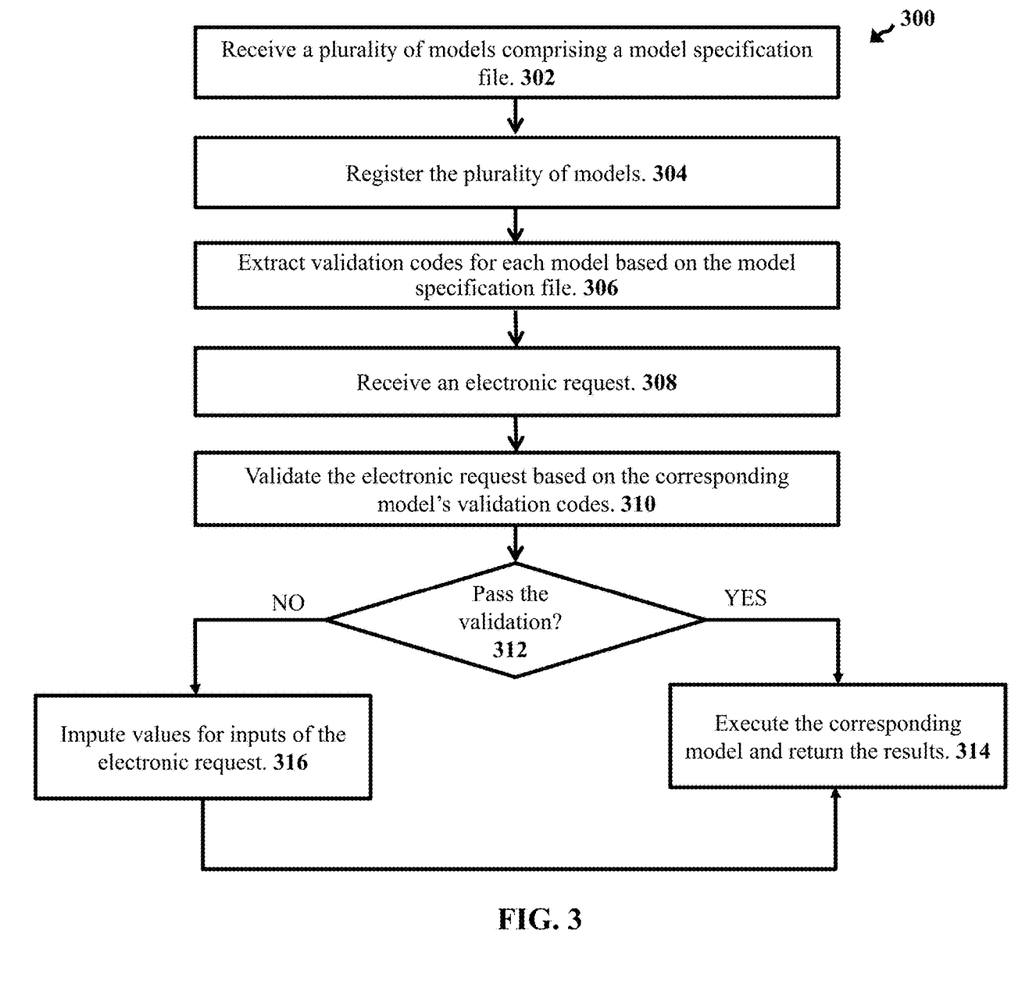
FIG. 3 illustrates a flowchart depicting operational steps for processing electronic requests, according to an embodiment.

FIG. 3 illustrates execution of a method 300 for processing electronic requests, according to an embodiment. Other embodiments may comprise additional or alternative steps, or may omit some steps altogether.

At step 302, the analytic server may receive a plurality of predictive computer models, each predictive computer model comprising a model specification file. Each model specification file may indicate a set of validation codes that comprise at least a required range and type to execute the predictive computer model. Each predictive computer model may provide a different prediction service. The plurality of predictive computer models may be individual models developed by different data scientists and stored in distributed devices. A data scientist may train a predictive computer model for a certain prediction service. The data scientists may store their models in any database of any storage devices of their preferences. For example, the predictive computer models may locate in the data scientists' local storage devices, remote storage devices, or other cloud storage devices.

A data scientist may also create a model specification file to describe the trained model. The speciation file may include description on the service provided by the model, the input schemas/rules, the expected output, flow pattern description of the model, and any other information about the model. The input schemas/rules in the specification file may describe the restrictions of the inputs of the corresponding model. For example, the input rules may define the data types of the inputs, the ranges of numbers, string lengths of the inputs, and the like. Different data scientists may individually develop the plurality of predictive computer models. Different models may be separate from each other.

In some embodiments, the analytic server may automatically generate the model specification file based on the received predictive computer model. For example, the analytic server may parse the source code of a predictive computer model and extract operational logics of the predictive computer model. The analytic server may determine the expected input, the expected output, and the model's purpose based on the operational logics. Furthermore, the analytic server may generate the model specification file to include the input schemas/rules corresponding to the expected input, the expected output, service description of the model, and any other information about the model.

The model specification files may be based on a template. The template may include a set of fields to describe the model, such as the name of the model, the data types of the inputs, number ranges of the inputs, string lengths of the inputs, the data type of the output, the meaning of the output, the provided service of the model, and the like. The data scientists or the analytic server may fill in configuration data for the fields in the template to create a specification file for the trained model. The template may be in a human-readable data-serialization language, such as YAML, which is readable, flexible, and commonly used for configuration files.

At step 304, the analytic server may register the predictive computer models on a model-by-model basis. The analytic server may register each predictive computer model by creating a package to include functions of the plurality of predictive computer models. For example, the analytic server may add the source code of each model in a package of an integrated development environment. The analytic server may further add comment to the function of each predictive computer model. The comment may comprise the ID of the predictive computer model. The analytic server may also define the path/location of the package in the form of URL. Users/systems may visit the URL to access the package and call the predictive computer models based on their IDs.

The analytic server may utilize an integrated development environment to call the predictive computer models. The analytic server may create a package in the integrated development environment to include the functions of the predictive computer models. For example, the analytic server may create a package (e.g., Plumber package in R) and copy the source code of each predictive computer model into the package. Furthermore, the analytic server may define the web APIs by adding special annotations or comments to the functions of the predictive computer models. The annotation or comment may allow users to make their own functions accessible to other systems. The comment for each function may define the Web API of the function and comprise an ID for the function. As a result, other users/systems may leverage the ID in the comment to call the corresponding function. For example, one of the functions may plot a histogram. The comment for this function may be "#* @get /plot." The "plot" included in the comment may be the ID of this function. Users/systems may call the function for plotting a histogram using the ID of "plot."

The analytic server may further define the location of the package containing the predictive computer model functions in the form of URL. Other users or systems may be able to visit the URL using a browser or a terminal to access the package. With the location of the package and the function ID available, users/systems may be able to access the functions included in the package and run the functions to obtain results.

In operation, users/systems may append the function ID to the URL of the packet to call the specific function included in the packet. For example, assuming the URL for the packet is "http://localhost:8000" and the ID for the plot function defined in the comment is "plot." To call the plot function in the packet, users/systems may visit the URL "http://localhost:8000/plot" for the execution of the plot function.

At step 306, the analytic server may extract the set of validation codes for each predictive computer model based on the model specification file. As discussed above, each predictive computer model may have a model specification file describing the model, including the input rules for each model. The analytic server may parse the model specification file and extract input validation codes corresponding to the input rules included in the model specification file. The analytic server may extract the validation codes using natural language processing algorithms. The analytic server may use the validation codes to determine whether inputs for a model satisfying the input rules.

For example, a mortality model may accept user age, user heart condition, and user smoking status as inputs to determine the user's probability of dying before a certain age. The specification file of the mortality model may specify that the accepted input type for user age is numeric, the range for the user age is from 18 to 60, the accepted input type for heart condition is string with a maximum string length of 150, and the accepted input type of the smoking status is Boolean (e.g., false or true). The analytic server may parse the specification file and extract such rules as the validation codes for the mortality model.

At step 308, the analytic server may receive an electronic request, in the API layer, to execute a predictive computer model using a set of inputs included in the electronic request. The electronic request may request a certain prediction service that requires a corresponding model to execute based on the set of inputs. The analytic server may identify the predictive computer model corresponding to the received electronic request. For example, a customer or a sales agent may issue a request to determine the customer's mortality score. The electronic request may comprise a set of inputs, such as the user age, heart condition, and the smoking status. The analytic server may receive the request and determine that the corresponding model is the mortality model.

In some embodiments, the analytic server may receive a large number of electronic requests at the same time. The API layer of the analytic server may assign the requests to different predictive computer models. In the registration process, the analytic server may record a set of predictive computer models from different data scientists. When the analytic server receives the electronic requests in API layer, the analytic server may determine, in the API layer, the corresponding models and call the corresponding models.

The steps of various embodiments may be performed in different orders. For example, in the present embodiment, the analytic server may register the plurality of predictive computer models before receiving the electronic requests. In some other embodiments, the analytic server may register the plurality of predictive computer models after receiving the electronic requests.

At step 310, the analytic server may validate the electronic request based on the corresponding model's validation codes. After the analytic server receives the electronic requests in the API layer, the analytic server may assign each electronic request to a corresponding model based on the requested service and the model's registration information. Furthermore, before executing the model, the analytic server may validate the electronic request, in the API layer, by verifying the set of inputs included in the request satisfying the validation codes of the corresponding predictive computer model.

For example, assuming a user issues an electronic request to determine a morality score, the set of the inputs in the electronic request comprise the user age, heart condition, and smoking status. The analytic server may extract the user inputs from the request and compare the inputs against the mortality model's input validation codes. For example, the analytic server may check if the input user age is a number within the range of 18 to 60, if the heart condition is a string with the number of characters less than or equal to 150, and if the smoking status is a Boolean value (e.g., "true" or "false").

By validating the electronic requests, the analytic server may be able to make sure that only valid requests are processed. While there is no validation for the requests and the invalid requests may crash the system in conventional methods, the method and system described herein may provide more robust service by filtering out invalid requests and provide more efficient service by focusing on the valid requests only.

At step 312, the analytic server may determine whether the electronic request passes the validation. The analytic server may determine whether the set of inputs in the electronic request satisfies the validation codes of the corresponding predictive computer model. If the electronic request passes the validation, the process proceeds to step 314; otherwise, the process proceeds to step 316.

At step 314, in response to the set of inputs satisfying or corresponding to the set of validation codes of the corresponding predictive computer model, the analytic server may execute the corresponding predictive computer model using the set of inputs to generate output results and return the results. The analytic server may execute the corresponding model in the model execution layer that is separate from the API layer.

The analytic server may call the function of the corresponding predictive computer model by accessing the package containing the model and running the function based on the function ID. In operation, the analytic server may visit the URL of the packet appended with the function ID to run the specific function of the predictive computer model. Furthermore, the analytic server may supply/pass the set of inputs of the electronic request as parameters to the function of the predictive computer model. For example, the analytic server may supply the user age, user heart condition, and user smoking status to the function of the mortality model and execute the mortality model based on such user information to obtain the output mortality score.

The analytic server may be able to provide scalability and process large number of electronic requests at the same time by leveraging the build-in scalability of the integrated development environment. Execution of the predictive computer models may be through the integrated development environment. Such an integrated development environment may provide built-in scalability to enable efficient resource allocation and load balance. For example, the integrated development environment may provide a platform to share various resources including static and dynamic content in one place. Execution servers of the integrated development environment may run across a multi-node cluster to scale computation and ensure high availability for all the content.

In some embodiments, as the execution layer of the analytic server calls the corresponding predictive computer model through the integrated development environment, the execution server of the integrated development environment, may perform the execution of the functions of the predictive computer models. As a result, the analytic server may shift the computation or execution of the predictive computer models to a third-party server that has built-in scalability for efficient request processing.

After the execution of the predictive computer model, the analytic server may transmit, by model execution layer of the server, the generated results to the API layer of the server. The API layer of the server may transmit the generated results to the user's electronic device. More specifically, the electronic requests may come in via the API layer, and enter the model execution layer. After the execution of the model, the results may travel back to the API layer and reach the user's electronic device. The communication between the API layer and the model execution layer may be over the efficient RPC protocol. The results may be eventually displayed on the user's electronic device. For example, the analytic server may display the results in a GUI on the user's electronic device. In some embodiments, the analytic server may transmit the results via an electronic message, such as an email, an SMS (short message service) message, a voice mail, and the like.

At step 316, in response to the set of inputs not satisfying or corresponding to the set of validation codes of the corresponding predictive computer model, the analytic server may impute one or more valid values for the inputs of the electronic request. The analytic server may execute the corresponding predictive computer model based on the imputed values as described in step 314.

Alternatively, the analytic server may transmit an electronic message comprising error information regarding the electronic request to the user's electronic device through the API layer. As discussed above, the API layer of the analytic server may perform request input validation and error handling. If the request fails the input validation, the analytic server may return a 400 BAD REQUEST response with helpful, human-readable error messages in the response.

In the embodiments of imputing valid values for the inputs, the analytic server may leverage statistic algorithms for the imputing of values. For example, assuming one of the inputs requires the user's age, and the effective age range is from 18 to 60. A user may input "180" as the user age in one electronic request. The analytic server may determine that the input user age is invalid. To impute a valid value for the user, the analytic server may leverage the user's other attributes or information to estimate the user's age. For example, the analytic server may use the user's education history and/or work history to estimate the user's age. The analytic server may also refer to other users with similar attributes. For example, the analytic server may determine the average age of people graduating in the same year. The analytic server may use the determined average age as the user's imputed age. The analytic server may call and execute the predictive computer model using the imputed values.

In addition, the analytic server may log the invalid electronic requests from the same user. After a predetermined period of time (e.g., after a month), the analytic server may transmit an electronic message comprising the invalid electronic requests to the user device. For example, the electronic message may be an email message informing the user that the user has been inputting an invalid age of 180 for multiple times.

Non-Limiting Example:

An analytic server receives an electronic request to determine a customer's mortality score. The electronic request includes a set of inputs, such as user age, heart condition, and smoking status. The specification file of the mortality model may specify that the accepted input type for user age is numeric, the range for the user age is from 18 to 60, the accepted input type for heart condition is string with a maximum string length of 150, and the accepted input type of the smoking status is Boolean. The analytic server validates the request inputs by checking whether the inputs satisfying the validation codes of the specification file of the mortality model. The API layer of the analytic server performs the input validation. If the request fails the input validation, the analytic server imputes one or more valid values for the inputs. For example, if the received user age is 180, the analytic server estimates a valid value for the user based on the user's other attributes, such as the education history and/or work history. If the request passes the input validation, the API layer transmits the request to the predictive model execution layer. Within the predictive model execution layer, the analytic server utilizes an integrated development environment provided by a third-party server to call the function of the mortality model. The third-party server performs the execution of the mortality model and outputs the mortality score. The analytic server further transmits the mortality score from the predictive model execution layer to the API layer. The API layer transmits the mortality score to the user's device.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for improving efficiency of a plurality of predictive computer models, the method comprising:

automatically generating, by a server, a model specification file for each predictive computer model of a plurality of predictive computer models by parsing source code of each predictive computer model, the source code indicating a set of validation codes comprising at least one required input range and type to execute the predictive computer model;

registering, by the server, each predictive computer model by creating a package to include functions of the respective predictive computer model;

receiving, via an application programming interface layer of the server, from an electronic device, an electronic request to execute a first predictive computer model of the plurality of predictive computer models using a set of inputs;

validating, by the server in the application programming interface layer, prior to executing the first predictive computer model, the electronic request by verifying that the set of inputs corresponds to the required input range and type in the set of validation codes of the first predictive computer model; and in response to the set of inputs not corresponding to the required input range and type in the set of validation codes of the first predictive computer model:
calculating, by the server, one or more valid values for the set of inputs within the required range and type;
revising, by the server, the package to include the calculated one or more values and an identifier of the revised package;
executing, by a model execution layer of the server, the first predictive computer model based on the calculated one or more valid values by calling functions of the first predictive computer model within its respective revised package to generate output results; and
transmitting, by the model execution layer of the server, the generated output results to the application programming interface layer of the server, whereby the application programming interface layer of the server transmits the generated output results to the electronic device,
whereby the predictive computer model is executed when the one or more values are valid.

2. The method of claim 1, further comprising:
in response to the set of inputs corresponding to the required input range and type in the set of validation codes of the first predictive computer model, executing, by the model execution layer of the server, the first predictive computer model based on the set of inputs by calling the function of the first predictive computer model.

3. The method of claim 1, further comprising:
in response to the set of inputs not corresponding to the required input range and type in the set of validation codes of the first predictive computer model, transmitting, by the application programming interface layer of the server, an electronic message comprising error information regarding the electronic request to the electronic device.

4. The method of claim 1, further comprising:
adding, by the server, comments in the package comprising identifiers of the functions.

5. The method of claim 1, wherein the location of the package is a uniform resource locator.

6. The method of claim 1, further comprising:
creating, by the server, the package containing the functions of the plurality of predictive computer models through an integrated development environment provided by a third-party server.

7. The method of claim 1, further comprising:
authenticating, by the server, identities of data scientists uploading the plurality of predictive computer models with two-factor authentication.

8. The method of claim 1, wherein the model specification file is generated based on a template.

9. The method of claim 1, wherein the model specification file comprises input schemas, expected output, and description of a service of a predictive computer model.

10. The method of claim 1, wherein communication between the application programming interface layer and the model execution layer is through a unified remote procedure call protocol.

11. A server configured for improving efficiency of a plurality of predictive computer models, the server comprising a processor and a non-transitory computer-readable medium containing instructions that when executed by the processor causes the processor to perform operations comprising:

automatically generate a model specification file for each predictive computer model of a plurality of predictive computer models by parsing source code of each predictive computer model, the source code indicating a set of validation codes comprising at least one required input range and type to execute the predictive computer model;

register each predictive computer model by creating a package to include functions of the respective predictive computer model;

receive, via an application programming interface layer of the server, from an electronic device, an electronic request to execute a first predictive computer model of the plurality of predictive computer models using a set of inputs;

validate, by the server in the application programming interface layer, prior to executing the first predictive computer model, the electronic request by verifying that the set of inputs corresponds to the required input range and type in the set of validation codes of the first predictive computer model; and in response to the set of inputs not corresponding to the required input range and type in the set of validation codes of the first predictive computer model:
calculate one or more valid values for the set of inputs within the required range and type;
revise the package to include the calculated one or more values and an identifier of the revised package;
execute the first predictive computer model based on the calculated one or more valid values by calling functions of the first predictive computer model within its respective revised package to generate output results; and
transmit the generated output results to the application programming interface layer of the server, whereby the application programming interface layer of the server transmits the generated output results to the electronic device,
whereby the predictive computer model is executed when the one or more values are valid.

12. The system of claim 11, wherein the instructions further cause the processor to:
in response to the set of inputs corresponding to the required input range and type in the set of validation codes of the first predictive computer model, executing, by the model execution layer of the server, the first predictive computer model based on the set of inputs by calling the function of the first predictive computer model.

13. The system of claim 11, wherein the instructions further cause the processor to:
   in response to the set of inputs not corresponding to the required input range and type in the set of validation codes of the first predictive computer model, transmitting, by the application programming interface layer of the server, an electronic message comprising error information regarding the electronic request to the electronic device.

14. The system of claim 11, wherein the instructions further cause the processor to:
   adding, by the server, comments in the package comprising identifiers of the functions.

15. The system of claim 11, wherein the location of the package is a uniform resource locator.

16. The system of claim 11, wherein the instructions further cause the processor to:
   creating, by the server, the package containing the functions of the plurality of predictive computer models through an integrated development environment provided by a third-party server.

17. The system of claim 11, wherein the instructions further cause the processor to: authenticating, by the server, identities of data scientists uploading the plurality of predictive computer models with two-factor authentication.

18. The system of claim 11, wherein the model specification file is generated based on a template.

19. The system of claim 11, wherein the model specification file comprises input schemas, expected output, and description of a service of a predictive computer model.

20. The system of claim 11, wherein communication between the application programming interface layer and the model execution layer is through a unified remote procedure call protocol.

\* \* \* \* \*